United States Patent
Gotoh et al.

(10) Patent No.: US 7,736,061 B2
(45) Date of Patent: Jun. 15, 2010

(54) FLUID DYNAMIC BEARING MOTOR, AND RECORDING-MEDIUM DRIVING APPARATUS

(75) Inventors: Hiromitsu Gotoh, Chiba (JP); Atsushi Ohta, Chiba (JP)

(73) Assignee: Seiko Instruments Inc. (JP)

( * ) Notice: Subject to any disclaimer, the term of this patent is extended or adjusted under 35 U.S.C. 154(b) by 599 days.

(21) Appl. No.: 11/629,013

(22) PCT Filed: Jun. 2, 2005

(86) PCT No.: PCT/JP2005/010175

§ 371 (c)(1),
(2), (4) Date: May 4, 2007

(87) PCT Pub. No.: WO2005/121575

PCT Pub. Date: Dec. 22, 2005

(65) Prior Publication Data

US 2008/0089626 A1    Apr. 17, 2008

(30) Foreign Application Priority Data

Jun. 11, 2004    (JP) ............................. 2004-174712

(51) Int. Cl.
*F16C 32/06* (2006.01)
(52) U.S. Cl. ................. 384/113; 384/107; 384/123; 384/120
(58) Field of Classification Search ................. 384/100, 384/107, 112, 114, 119–120, 130, 113
See application file for complete search history.

(56) References Cited

U.S. PATENT DOCUMENTS

| | | | | |
|---|---|---|---|---|
| 5,114,245 A | * | 5/1992 | Tanaka et al. ............... | 384/107 |
| 5,433,529 A | * | 7/1995 | Hensel ........................ | 384/112 |
| 5,647,672 A | * | 7/1997 | Fukutani ..................... | 384/100 |
| 5,988,886 A | * | 11/1999 | Takahashi ................... | 384/112 |
| 6,066,903 A | * | 5/2000 | Ichiyama .................... | 384/107 |
| 6,271,612 B1 | * | 8/2001 | Tanaka et al. ................. | 310/90 |
| 6,828,709 B2 | * | 12/2004 | Grantz et al. ............... | 384/110 |
| 6,834,996 B2 | * | 12/2004 | Gomyo et al. .............. | 384/107 |
| 6,888,278 B2 | * | 5/2005 | Nishimura et al. .......... | 384/119 |
| 7,196,868 B2 | * | 3/2007 | Asada et al. ............. | 360/98.07 |
| 2001/0022869 A1 | * | 9/2001 | Tanaka et al. ............... | 384/100 |
| 2004/0028300 A1 | * | 2/2004 | Gomyo et al. .............. | 384/107 |

(Continued)

FOREIGN PATENT DOCUMENTS

JP    6-121483 A    4/1994

(Continued)

*Primary Examiner*—Marcus Charles
(74) *Attorney, Agent, or Firm*—Adams & Wilks

(57) ABSTRACT

A fluid dynamic bearing has pressure-generating grooves provided in opposed thrust surfaces of a thrust bearing portion opposite a circular plate and a stopper to direct a working fluid from inner and outer peripheral edges of the thrust bearing portion toward a radially intermediate portion thereof as a shaft member rotates relative to a support. One or more through-holes are provided between inner edges of annular regions of the thrust surfaces in which the pressure-generating grooves are provided and the intermediate portion in the radial direction. The through-holes extend through the thrust bearing portion and interconnect pressure-generating grooves in the opposed thrust surfaces so that bubbles in the working fluid can be sucked smoothly into the through-holes through the pressure-generating grooves.

19 Claims, 12 Drawing Sheets

U.S. PATENT DOCUMENTS

| | | | |
|---|---|---|---|
| 2004/0032175 A1 * | 2/2004 | Grantz et al. | 310/90 |
| 2004/0113501 A1 * | 6/2004 | Tokunaga et al. | 384/107 |
| 2007/0253651 A1 * | 11/2007 | Gotoh et al. | 384/107 |

FOREIGN PATENT DOCUMENTS

| | | |
|---|---|---|
| JP | 8-145049 A | 6/1996 |
| JP | 10-288221 A | 10/1998 |
| JP | 2001027225 A * | 1/2001 |
| JP | 2001-065552 | 3/2001 |
| JP | 2002-155943 A | 5/2002 |
| JP | 2002372039 A * | 12/2002 |
| JP | 2003-148457 A | 5/2003 |
| JP | 2003-314535 A | 11/2003 |
| JP | 2003-348792 A | 12/2003 |
| JP | 2004-052987 A | 2/2004 |
| JP | 2005-127510 A | 5/2005 |

* cited by examiner (a)

(b)

FLUID DYNAMIC BEARING MOTOR, AND RECORDING-MEDIUM DRIVING APPARATUS

CROSS-REFERENCE TO RELATED APPLICATIONS

This application is a U.S. national stage application of International Application No. PCT/JP2005/010175, filed Jun. 2, 2005, claiming a priority date of Jun. 11, 2004, and published in a non-English language.

BACKGROUND OF THE INVENTION

1. Technical Field

The present invention relates to fluid dynamic bearings, motors, and recording-medium driving apparatuses.

2. Background Art

Fluid dynamic bearings are used as shaft bearings for apparatuses requiring high rotational accuracy. This type of bearing has a gap, filled with a working fluid, between a shaft and a housing to rotatably support the shaft relative to the housing. When the bearing rotates, the working fluid produces a dynamic pressure to keep the shaft and the housing out of contact with each other.

An example of an apparatus requiring high rotational accuracy is a recording medium such as a hard disk. The rotational speed and accuracy of hard disks are becoming increasingly higher with increasing recording density.

Fluid dynamic bearings are suitable for use in spindle motors for driving recording media having increasingly higher rotational speed and accuracy, including hard disks.

The demand for reduction in the size and thickness of recording media such as hard disks, as well as higher rotational speed and accuracy, has been increasing in recent years. Accordingly, various techniques have been disclosed to provide thinner fluid dynamic bearings (for example, see Patent Document 1).

Patent Document 1: Japanese Unexamined Patent Application, Publication No. 2001-65552 (for example, pages 3 and 4 and FIG. 1).

A thrust bearing of a dynamic bearing unit disclosed in Patent Document 1 above includes a sleeve having a flange (thrust plate) defining a thrust dynamic bearing portion and a shaft member having a circumferential portion surrounding the flange. A fluid such as oil is provided between axially opposing surfaces of the flange of the sleeve and the circumferential portion of the shaft member to produce a dynamic pressure when the shaft member rotates. The flange has pressure-generating grooves for producing dynamic pressure in the oil when the shaft member rotates.

The dynamic bearing unit also includes an absorbing sheet for absorbing oil leaking from the thrust bearing.

If, however, the dynamic bearing unit is started with the surface of the flange where the pressure-generating grooves are provided and the inner surface of the shaft member close to each other, the grooves attract the surrounding oil to produce a negative pressure that causes bubbles in oil-poor regions. These bubbles degrade the lubrication performance of the oil and can thus cause problems such as vibration due to unstable rotation and, at worst, fusion of the bearing due to metal-to-metal contact.

In addition, the oil can leak out of the thrust bearing because the bubbles squeeze the oil. Although the absorbing sheet absorbs the leaking oil, an oil film forms between the thrust bearing and the absorbing sheet. This oil film is no longer easy to cut off and is thus constantly fed to the absorbing sheet. Accordingly, the absorbing sheet continues to absorb the oil until becoming saturated. As a result, the amount of oil provided on the thrust bearing decreases and, furthermore, the oil can be totally depleted. This makes it difficult to maintain the operation of the fluid dynamic bearing.

SUMMARY OF THE INVENTION

In light of the above problems, an object of the present invention is to provide a thinner fluid dynamic bearing capable of stable shaft rotation, a motor including the bearing, and a recording-medium driving apparatus including the bearing.

To achieve the above object, the present invention provides the following:

A fluid dynamic bearing according to a first aspect of the present invention includes a shaft member including a substantially cylindrical portion and a circular plate extending radially outward from the cylindrical portion; a support including a cylinder having a closed end and rotatably accommodating the cylindrical portion and a flange-shaped thrust bearing portion extending radially outward from the cylinder; a stopper engaged with the circular plate such that the thrust bearing portion is held therebetween; and a working fluid filling gaps between the shaft member and the support and between the support and the stopper. Pressure-generating grooves are provided in thrust surfaces of the thrust bearing portion opposite the circular plate and the stopper to attract the working fluid from inner and outer edges of the thrust bearing portion to a radially midway portion thereof as the shaft member rotates relative to the support. One or more through-holes are provided between inner edges of annular regions of the thrust surfaces in which the pressure-generating grooves are provided and the midway portion in the radial direction. The through-holes extend through the thrust bearing portion in a central-axis direction of the shaft member.

According to the first aspect of the present invention, the shaft member, which is stopped after moving axially in one direction with respect to the support, can be rotated relative to the support to produce the effect of attracting the working fluid to the thrust surfaces. This attracting effect causes the working fluid to flow through the through-holes from a wider gap defined by one of the thrust surfaces of the thrust bearing portion to a narrower gap defined by the other thrust surface. According to the present invention, the through-holes are formed in the annular regions of the thrust surfaces to supply the working fluid to the pressure-generating grooves in the annular regions.

This structure can avoid an excessive negative pressure and thus generation of bubbles to prevent deterioration of the lubrication performance of the working fluid, stabilize the rotation of the shaft member relative to the support, and suppress vibrations.

The term "midway portion" refers to a predetermined position between the inner and outer edges of the annular regions of the thrust surfaces. Preferably, the pressure-generating grooves extend radially outward from the inner edge in a direction inclined with respect to the radial direction and are bent at the midway portion in a direction inclined in the opposite direction before reaching the outer edge.

In addition, because bubbles can be prevented, no bubbles squeeze the working fluid, and thus the fluid does not leak out. The structure described above can therefore eliminate the need to use an absorbing member for absorbing leaking working fluid, thus reducing the number of components of the fluid dynamic bearing and contributing to a reduction in the thickness thereof.

Even if bubbles occur in the working fluid, they are sucked into the through-holes as the rotor rotates relative to the support. The fluid dynamic bearing can therefore prevent deterioration of the lubrication performance of the working fluid on sliding surfaces and the thrust surfaces of the shaft member and the support, stabilize the rotation of the shaft member relative to the support, and suppress vibrations.

In the first aspect of the present invention, preferably, the through-holes are positioned so as to be connected to any of the pressure-generating grooves.

If the through-holes are positioned so as to be connected to any of the pressure-generating grooves, bubbles occurring in the working fluid can be smoothly sucked into the through-holes through the pressure-generating grooves.

In the first aspect of the present invention, preferably, substantially the entirety of the through-holes is positioned in the annular regions in which the pressure-generating grooves are provided.

Because substantially the entirety of the through-holes is positioned in the annular regions in which the pressure-generating grooves are provided, the working fluid can be supplied to the annular regions.

In the first aspect of the present invention, preferably, annular grooves are provided radially inside the annular regions around the circumference thereof to define clearance portions, and the through-holes are positioned so as to be connected to the pressure-generating grooves, areas of the annular regions other than the pressure-generating grooves, and the clearance portions.

Because the through-holes are positioned so as to be connected to the pressure-generating grooves, bubbles occurring in the working fluid can be smoothly sucked into the through-holes through the pressure-generating grooves. Because the through-holes are positioned so as to be connected to the areas of the annular regions other than the pressure-generating grooves, the working fluid can be supplied to the annular regions. Because the through-holes are positioned so as to be connected to the clearance portions, the working fluid is sucked into the through-holes through the clearance portions.

In the first aspect of the present invention, preferably, the through-holes are arranged at regular intervals in a circumferential direction of the thrust bearing portion around the central axis.

The through-holes arranged at regular intervals in the circumferential direction of the thrust bearing portion around the central axis allow distributed supply of the working fluid over the annular regions and ensure the weight and rotation balance of the shaft member.

In the first aspect of the present invention, preferably, the pressure-generating grooves produce a higher working-fluid pressure at the outer edge of the thrust bearing portion than at the inner edge thereof.

If the pressure-generating grooves produce a higher dynamic pressure around the outer edge of the thrust bearing portion than around the inner edge thereof, the dynamic pressure provides a larger force tending to support the thrust bearing portion around the outer edge thereof. As a result, the shaft member can be stably supported when the rotor rotates relative to the support.

A fluid dynamic bearing according to a second aspect of the present invention includes a shaft member including a substantially cylindrical portion and a circular plate extending radially outward from the cylindrical portion; a support including a cylinder having a closed end and rotatably accommodating the cylindrical portion and a flange-shaped thrust bearing portion extending radially outward from the cylinder; a stopper engaged with the circular plate such that the thrust bearing portion is held therebetween; and a working fluid filling gaps between the shaft member and the support and between the support and the stopper. At least part of a cylinder seal surface of the cylinder opposite the stopper and a stopper seal surface of the stopper opposite the cylinder is inclined in a direction away from the thrust bearing portion so as to approach the central axis and so that the seal surfaces diverge.

According to the second aspect of the present invention, the shaft member rotates relative to the support to exert a centrifugal force on the working fluid with the liquid surface thereof positioned between the cylinder seal surface and the stopper seal surface. The centrifugal force moves the working fluid radially outward and toward the thrust bearing portion along the stopper seal surface so that the working fluid does not leak from the gap between the support and the stopper.

The structure described above can therefore eliminate the need to use an absorbing member for absorbing leaking working-fluid, thus reducing the number of components of the fluid dynamic bearing and contributing to a reduction in the thickness thereof.

In addition, the prevention of fluid leakage avoids a decrease in the amount of working fluid provided in the gaps between the shaft member and the support and between the support and the stopper. The structure described above can therefore prevent deterioration of the lubrication performance of the working fluid on the sliding surfaces and the thrust surfaces of the shaft member and the support, stabilize the rotation of the shaft member relative to the support, and suppress vibrations.

Surface tension tends to shift the liquid surface of the working fluid in a direction in which the distance between the cylinder seal surface and the stopper seal surface decreases. In the present invention, the distance between the seal surfaces decreases toward the thrust bearing portion. Hence, the surface tension can prevent the working fluid from leaking from the gap between the support and the stopper.

In the second aspect of the present invention, preferably, the stopper seal surface is longer in the direction away from the thrust bearing portion than the cylinder seal surface.

In this case, the fluid dynamic bearing can prevent the leakage of the working fluid due to gravity along the stopper seal surface if the stopper is disposed below the cylinder, that is, if the shaft member is oriented horizontally.

The working fluid, which tends to leak along the stopper seal surface due to gravity, is held on the thrust bearing portion side by surface tension. The liquid surface of the working fluid is stopped at a position where gravity and the surface tension are balanced. The stopping position of the liquid surface is farther away from the thrust bearing portion than in the case where the shaft member is oriented vertically. The stopper seal surface, which is longer than the cylinder seal surface, can hold the working fluid and prevent it from leaking out.

In the second aspect of the present invention, preferably, a groove is provided in the stopper seal surface to prevent the working fluid from leaking along the stopper seal surface.

The groove can prevent the liquid surface of the working fluid from moving away from the thrust bearing portion beyond the groove. This structure can therefore prevent the working fluid from leaking from the gaps between the shaft member and the support and between the support and the stopper at the groove.

In the second aspect of the present invention, preferably, a step is provided in the stopper seal surface to prevent the working fluid from leaking along the stopper seal surface.

The step can prevent the liquid surface of the working fluid from moving away from the thrust bearing portion beyond the groove. This structure can therefore prevent the working fluid from leaking from the gaps between the shaft member and the support and between the support and the stopper at the step.

A motor according to a third aspect of the present invention includes either the fluid dynamic bearing according to the first aspect of the present invention or the fluid dynamic bearing according to the second aspect of the present invention and a drive unit configured to rotate the shaft member of the fluid dynamic bearing relative to the support.

According to the third aspect of the present invention, the through-holes provided in the thrust bearing portion allow stable rotation of the shaft member on startup because the working fluid is supplied to the gap between the thrust bearing portion and the circular plate or the gap between the thrust bearing portion and the stopper through the through-holes. In addition, the fluid dynamic bearing can prevent generation of bubbles in the working fluid, and thus no bubbles cause the working fluid to leak out. The fluid dynamic bearing can therefore eliminate the need to use an absorbing member for absorbing leaking working fluid, thus contributing to a reduction in the thickness of the motor.

In addition, the cylinder seal surface of the support and the stopper seal surface of the stopper can prevent the leakage of the working fluid. The fluid dynamic bearing can therefore eliminate the need to use an absorbing member for absorbing leaking working fluid, thus contributing to a reduction in the thickness of the motor.

A recording-medium driving apparatus according to a fourth aspect of the present invention includes the motor according to the third aspect of the present invention and a fixing portion fixing a recording medium to the shaft member or the support.

According to the fourth aspect of the present invention, a circular recording medium can be stably rotated without vibrations by fixing it to the fixing portion of the shaft member or the support. The recording-medium driving apparatus can therefore prevent errors due to unstable rotation of the recording medium during writing and reading of information to and from the recording medium.

In addition, the fluid dynamic bearing can prevent the leakage of the working fluid, to avoid deposition of the working fluid onto the recording medium. The recording-medium driving apparatus can therefore prevent errors due to the working fluid during the writing and reading of information to and from the recording medium.

Furthermore, the prevention of fluid leakage eliminates the need to use an absorbing member for absorbing leaking working fluid, thus contributing to a reduction in the thickness of the recording-medium driving apparatus.

According to the present invention, the through-holes provided in the thrust bearing portion can avoid an excessive negative pressure in regions where the pressure-generating grooves are provided. The through-holes therefore have the effect of preventing the generation of bubbles and vibrations, thus stabilizing the rotation of the shaft member. In addition, because bubbles can be prevented, no bubbles squeeze the working fluid, and thus the fluid does not leak from the gaps. The fluid dynamic bearing can therefore eliminate the need to use an absorbing member for absorbing leaking working fluid, thus contributing to a reduction in the thicknesses of the fluid dynamic bearing, a motor including the bearing, and a recording-medium driving apparatus including the bearing.

In addition, the cylinder seal surface of the support and the stopper seal surface of the stopper can prevent the leakage of the working fluid. The fluid dynamic bearing can therefore avoid a decrease in the amount of working fluid provided in the gaps to prevent deterioration of the lubrication performance of the working fluid in the gaps, stabilize the rotation of the shaft member relative to the support, and suppress vibrations. The fluid dynamic bearing can also eliminate the need to use an absorbing member for absorbing leaking working fluid, thus contributing to a reduction in the thicknesses of the fluid dynamic bearing, a motor including the bearing, and a recording-medium driving apparatus including the bearing.

DETAILED DESCRIPTION OF THE INVENTION

A fluid dynamic bearing, a motor, and a recording-medium driving apparatus according to an embodiment of the present invention will now be described with reference to FIGS. 1 to 10.

Figure 1:
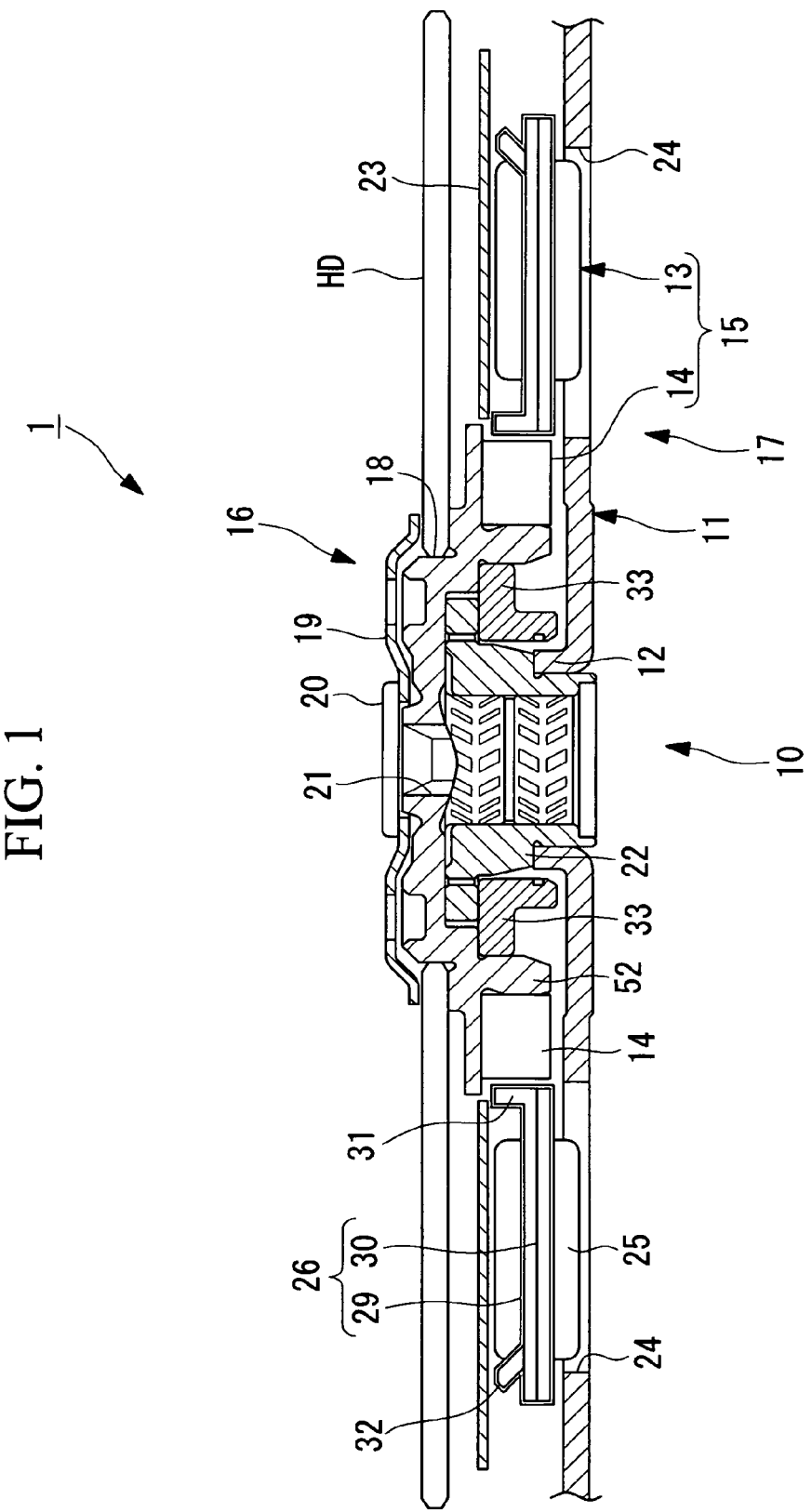
FIG. 1 is a sectional view of a recording-medium driving apparatus according to an embodiment of the present invention.

FIG. 1 is a sectional view of the overall structure of the recording-medium driving apparatus according to the embodiment of the present invention.

In FIG. 1, a fluid dynamic bearing 10 according to this embodiment is applied to a recording-medium driving apparatus 1. The recording-medium driving apparatus 1 includes a motor 17 including a stator 11 having electromagnets 13 annularly arranged inside the stator 11, a rotor (shaft member) 16 having a permanent magnet 14 disposed opposite the electromagnets 13, and the fluid dynamic bearing 10, which rotatably supports the rotor 16 relative to the stator 11. The electromagnets 13 of the stator 11 and the permanent magnet 14 of the rotor 16 constitute a drive unit 15 to rotate the rotor 16 relative to the stator 11.

The rotor 16 has a fitting portion (fixing portion) 18 fitted to a recording medium HD having an annular disc shape and a screw hole 21 into which a screw 20 is inserted to attach a pressing member 19 for fixing the recording medium HD. The pressing member 19 is formed of an annular plate having a convex shape in cross section and is attached to the rotor 16 by the screw 20. The recording medium HD is fitted to the fitting portion 18 of the rotor 16 and is pressed thereagainst by the pressing member 19 so that the recording medium HD is integrated with the rotor 16.

The stator 11 has a boss 12 disposed in the center of the electromagnets 13. A sleeve (support) 22 of the fluid dynamic bearing 10, as described later, is fitted to the boss 12 such that the permanent magnet 14 of the rotor 16 faces the electromagnets 13. A shield plate 23 is disposed between the electromagnets 13 and the recording medium HD to block magnetic fields generated by the electromagnets 13 and the permanent magnet 14. The shield plate 23 can reduce the effect of the magnetic fields of the electromagnets 13 and the permanent magnet 14 in the vicinity of the recording medium HD to avoid errors when information is read from the recording medium HD.

The stator 11 also has a stator opening 24 for accommodating coils 25 (described later) of the electromagnets 13. This stator opening 24 allows the electromagnets 13 to be brought closer to the stator 11 (to the bottom side of FIG. 1), thus facilitating a reduction in the thickness of the recording-medium driving apparatus 1.

Figure 2:
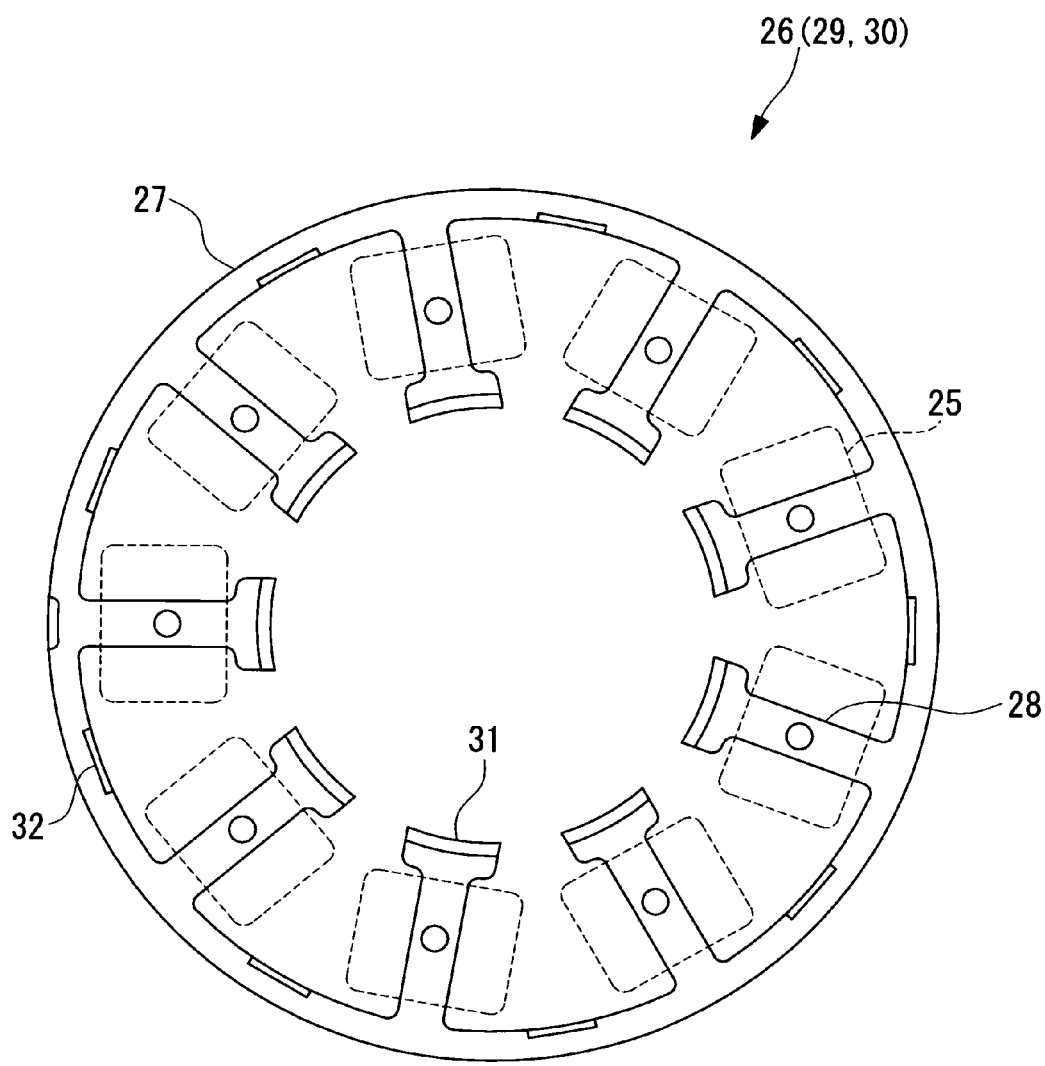
FIG. 2 is a plan view of a core plate shown in FIG. 1.

FIG. 2 is a plan view of a core plate 26 of the recording-medium driving apparatus 1 shown in FIG. 1.

In FIGS. 1 and 2, the electromagnets 13 are composed of the coils 25 and the core plate 26, which includes two metal plates around which the coils 25 are wound. The coils 25 are supplied with a three-phase alternating current to generate an alternating magnetic field. In FIG. 2, the core plate 26 has an annular core back 27 and radially inwardly extending teeth 28 that are wider circumferentially at leading ends thereof than outer portions thereof. The coils 25 are wound around the teeth 28.

In FIG. 1, the core plate 26 includes a first plate 29 facing the recording medium HD and a second plate 30 facing the stator 11. These plates 29 and 30 are stacked on top of each other. The first plate 29 has facing portions 31 facing the permanent magnet 14 substantially in parallel therewith. The facing portions 31 are formed by bending the leading ends of the teeth 28 toward the recording medium HD. The first plate 29 also has retaining portions 32 on the core back 27 to retain wiring lines extending between the coils 25. The retaining portions 32 are formed by cutting the core back 27 and bending up the cut portions thereof.

The facing portions 31 can increase the area where the electromagnets 13 face the permanent magnet 14 to enhance the driving force of the drive unit 15.

The core plate 26 is disposed such that the bottom end of the second plate 30 is positioned substantially in the same plane as the bottom end of the permanent magnet 14 and such that the top ends of the facing portions 31 of the first plate 29 are positioned substantially in the same plane as the top end of the permanent magnet 14.

This structure allows the core plate 26 to be brought closer to the stator 11, thus facilitating a reduction in the thickness of the recording-medium driving apparatus 1.

The electromagnets 13 can thus generate an alternating magnetic field acting on the permanent magnet 14 to rotate the rotor 16 relative to the stator 11.

Figure 3:
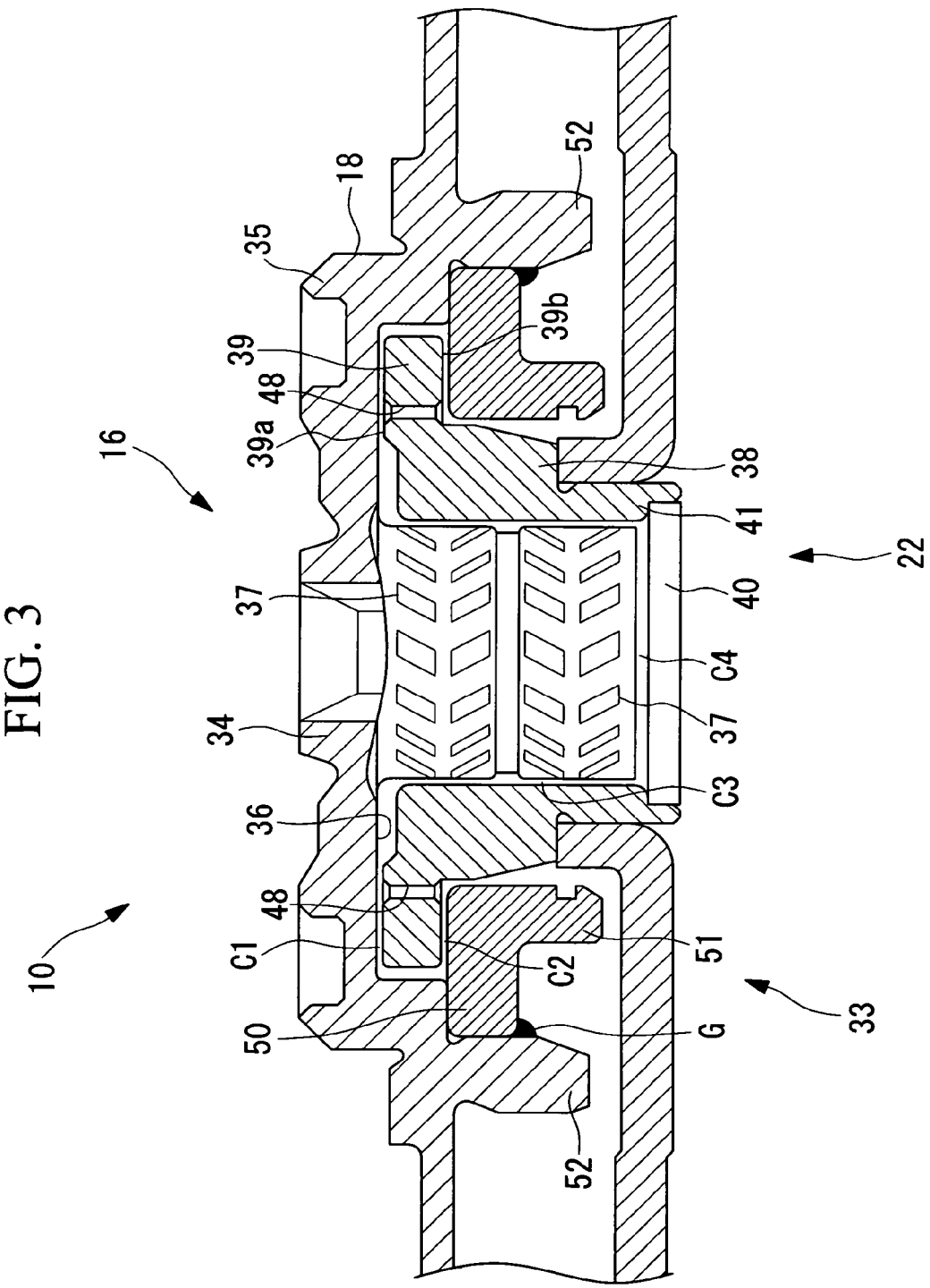
FIG. 3 is an enlarged sectional view of a fluid dynamic bearing shown in FIG. 1.

FIG. 3 is a sectional view of the fluid dynamic bearing of the recording-medium driving apparatus shown in FIG. 1.

In FIG. 3, the fluid dynamic bearing 10 according to this embodiment mainly includes the rotor 16 described above, the sleeve (support) 22 rotatably supporting the rotor 16, and a stopper 33 configured to prevent the rotor 16 from being detached from the sleeve 22.

The rotor 16 integrally includes a substantially cylindrical shaft (cylindrical portion) 34 and a circular, flange-shaped plate 35 extending radially outward from an end of a circumferential surface of the shaft 34, around the circumference thereof. A recess 36 and a yoke 52 are provided on a surface of the circular plate 35 opposite the sleeve 22. The recess 36 accommodates a thrust bearing portion 39, described later. The yoke 52 holds the stopper 33 and the permanent magnet 14. The fitting portion 18, which is fitted to the recording medium HD, is disposed on the top surface (facing upward in FIG. 3) of the circular plate 35.

The shaft 34 has two arrays of radial-pressure-generating grooves 37, called herringbone grooves, arranged axially in the circumferential surface of the shaft 34. Each of the arrays of the radial-pressure-generating grooves 37 includes grooves extending from one end of the shaft 34 in a direction inclined with respect to the generating line of the cylindrical surface of the shaft 34 and grooves extending from the circular plate 35 side in a direction inclined to the opposite direction. That is, the radial-pressure-generating grooves 37 are arranged in pairs so as to diverge in the rotational direction of the shaft 34. In FIG. 1, the pairs of grooves 37 are separated so as not to intersect each other, although they may intersect each other to form bent grooves.

The sleeve (support) 22 includes a cylinder 38 having a cylindrical opening for rotatably supporting the shaft 34 and the recess 36 accommodates the thrust bearing portion 39, which is flange-shaped so as to extend radially outward from an end of a circumferential surface of the cylinder 38, around the circumference thereof.

A bottom plate 40 is disposed at the bottom end (facing downward in FIG. 3) of the cylinder 38 to close the bottom end and defines the bottom surface thereof.

Figure 4:
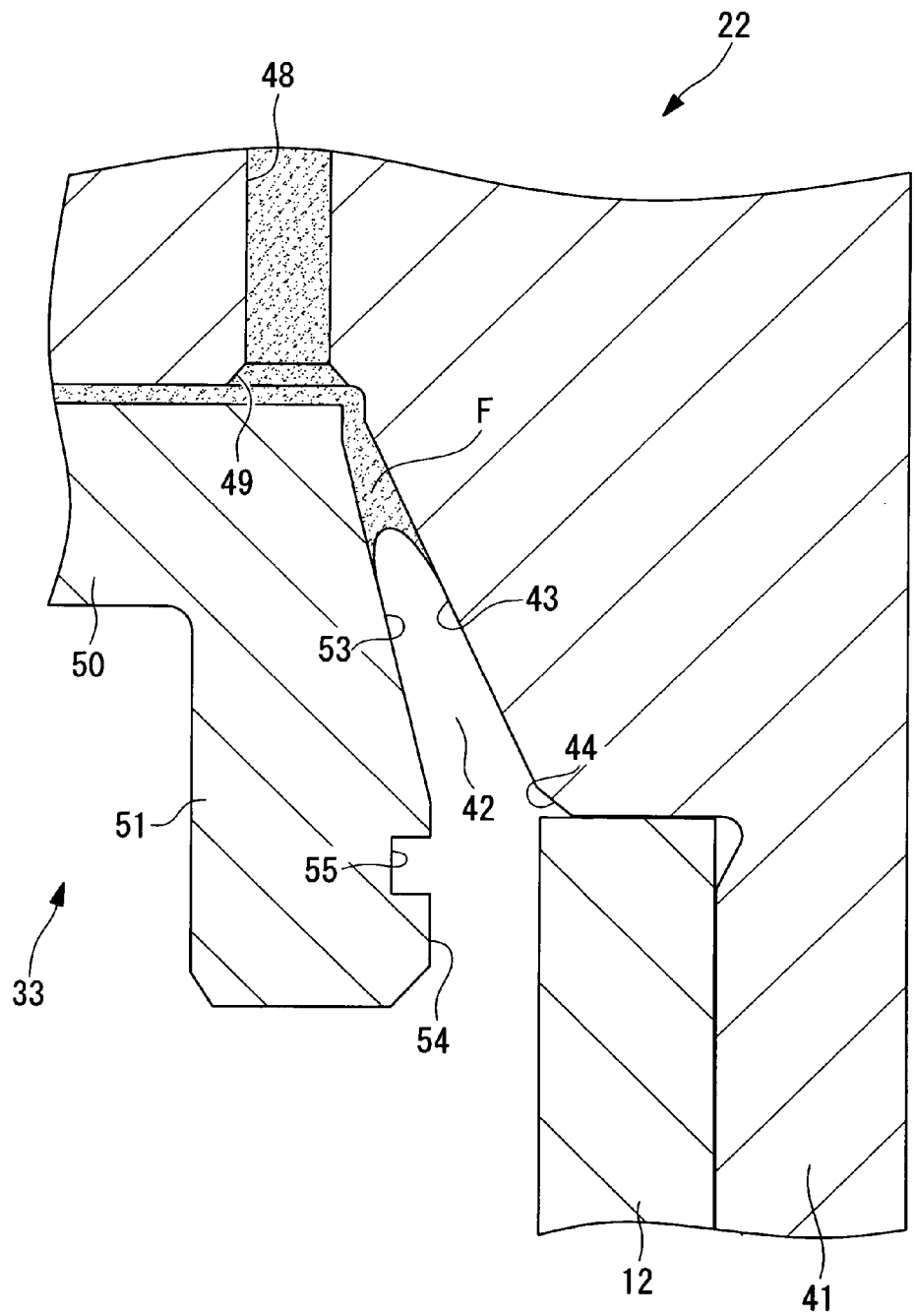
FIG. 4 is an enlarged sectional view of a capillary seal shown in FIG. 3.

FIG. 4 is an enlarged sectional view of a capillary seal 42 of the fluid dynamic bearing 10 shown in FIG. 3.

In FIGS. 3 and 4, the cylinder 38 has a sleeve fitting portion 41 fitted to the boss 12 of the stator 11 on the bottom of the cylinder 38 and a sleeve seal surface (cylinder seal surface) 43 between the thrust bearing portion 39 and the sleeve fitting portion 41. The capillary seal 42 is defined between the sleeve seal surface 43 and a stopper seal surface 53, described later. The sleeve seal surface 43 is inclined radially inward so as to extend toward the sleeve fitting portion 41. The sleeve seal surface 43 is beveled to form an oil-blocking surface 44 at a step between the sleeve seal surface 43 and the sleeve fitting portion 41.

FIG. 5(a) is a plan view of thrust-pressure-generating grooves formed in a top end surface of the thrust bearing portion of the fluid dynamic bearing according to this embodiment. FIG. 5(b) is a plan view of thrust-pressure-generating grooves formed in a bottom end surface of the thrust bearing portion of the fluid dynamic bearing according to this embodiment.

In FIGS. 5(a) and 5(b), annular clearance portions 45 and annular thrust surfaces 46 are disposed in the top end surface 39a and bottom end surface 39b of the thrust bearing portion 39 shown in FIG. 3 in the thickness direction thereof. The clearance portions 45 are formed radially inside the thrust bearing portion 39 around the circumference thereof. The thrust surfaces 46 are formed adjacent to the clearance portions 45 so as to extend radially outward therefrom. Many thrust-pressure-generating grooves (pressure-generating grooves) 47, called herringbone grooves, are formed in the thrust surfaces 46. These thrust-pressure-generating grooves 47 extend radially outward from the clearance portions 45 in a direction inclined with respect to the radial direction in an arc shape and are bent at a midway position (midway portion) thereof in a direction inclined to the opposite direction before reaching the outer edges.

Figure 5:
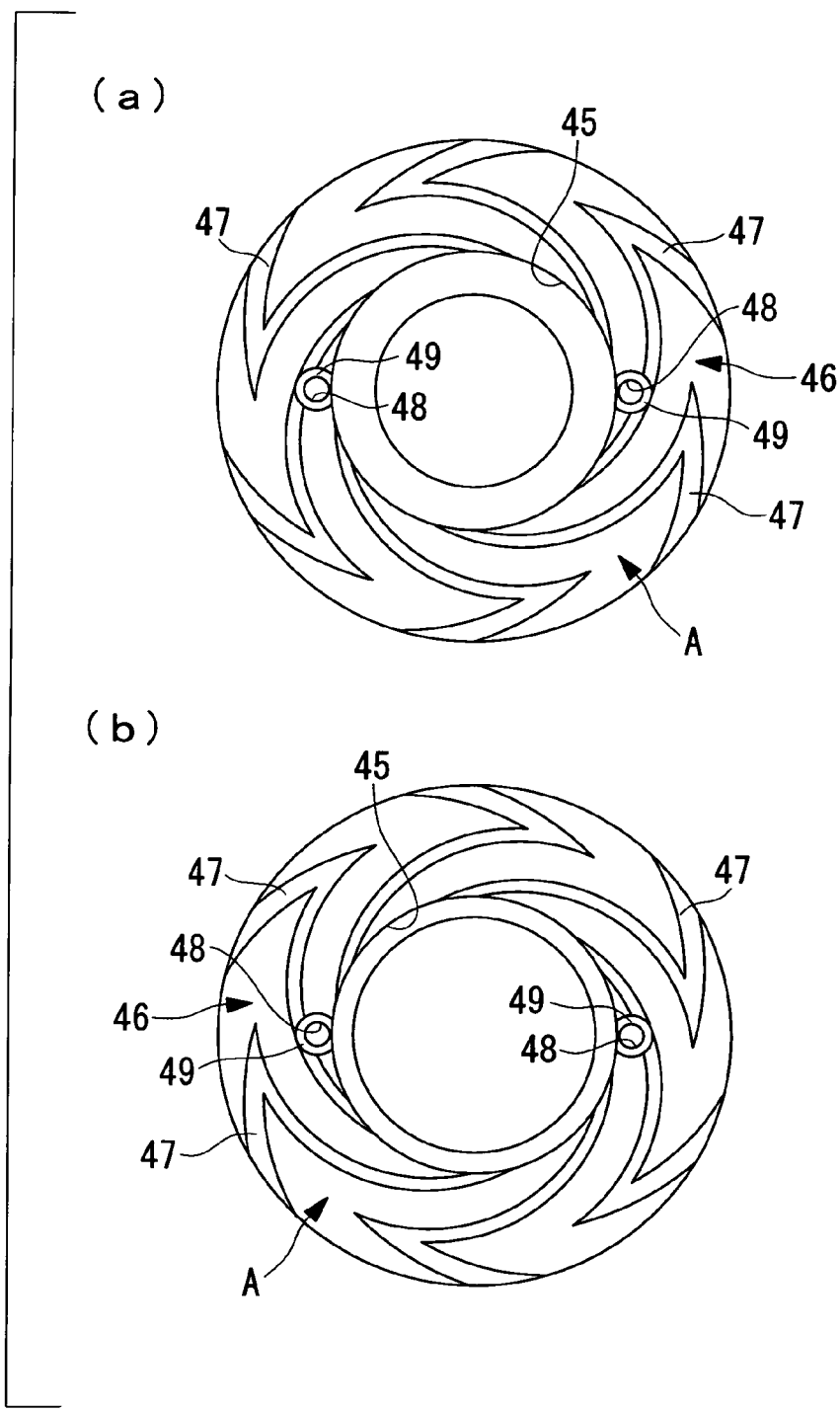
FIG. 5(a) is a plan view of thrust-pressure-generating grooves and through-holes formed in a top end surface of a thrust bearing portion shown in FIG. 3.
FIG. 5(b) is a plan view of thrust-pressure-generating grooves and through-holes formed in a bottom end surface of the thrust bearing portion shown in FIG. 3.

In FIGS. 3 and 5, the thrust bearing portion 39 has two through-holes 48 extending through the thrust bearing portion 39 along the thickness thereof. These through-holes 48 are separated from each other by an angular distance of 180° around the central axis of the shaft 34 so that they are aligned in the same radial direction. The through-holes 48 are formed at positions of the thrust surfaces 46 adjacent to the clearance portions 45. The through-holes 48 have beveled portions 49 formed around end openings thereof in the thrust surfaces 46. The beveled portions 49 are flared and tapered so as to diverge gradually toward the end openings and overlap the clearance portions 45 on the opening side. Thus, groove walls of the clearance portions 45 are partially removed so as to define communicating recesses connecting the through-holes 48 to the clearance portions 45.

In FIGS. 3 and 4, the stopper 33 mainly includes a circular stopper plate 50 for preventing the rotor 16 from being detached from the sleeve 22 and a seal cylinder 51 that defines the capillary seal 42 in combination with the sleeve 22.

The circular stopper plate 50 is fixed to the yoke 52 of the rotor 16 so that the thrust bearing portion 39 is held between the circular stopper plate 50 and the recess 36. The circular stopper plate 50 may be fixed to the yoke 52 using an adhesive G or by welding. The circular stopper plate 50 is preferably fixed to the yoke 52 without any gap to prevent oil, described later, from leaking from therebetween.

The seal cylinder 51 extends from an inner circumferential surface of the circular stopper plate 50 toward the stator 11. The stopper seal surface 53 is provided inside the seal cylinder 51 so that the capillary seal 42 is defined in a region between the stopper seal surface 53 and the sleeve seal surface 43. The stopper seal surface 53 is inclined radially inward so as to extend away from the circular stopper plate 50. The seal cylinder 51 has an annular groove 55 in an inner cylinder circumferential surface 54 adjacent to the end of the stopper seal surface 53 facing away from the circular stopper plate 50. The inner cylinder circumferential surface 54 may be cylindrical or inclined in the same manner as the stopper seal surface 53.

The capillary seal 42 is defined between the sleeve seal surface 43 and the stopper seal surface 53 so as to diverge in a direction away from the circular stopper plate 50.

A space outside the seal cylinder 51 in the radial direction may be used to accommodate, for example, the permanent magnet 14.

In FIG. 3, gaps C1 to C4 are defined between the shaft 34 and the sleeve 22 and between the sleeve 22 and the stopper 33. That is, the gap C1 is defined between the thrust surface 46 of one end surface 39a of the thrust bearing portion 39, where the thrust-pressure-generating grooves 47 are formed, and the opposite inner surface of the recess 36 of the rotor 16. The gap C2 is defined between the thrust surface 46 of the other end surface 39b of the thrust bearing portion 39 and the opposite surface of the stopper 33. The gap C3 is uniformly defined between the circumferential surface of the shaft 34, where the radial-pressure-generating grooves 37 are formed, and the inner circumferential surface of the cylinder 38, with the shaft 34 disposed in the center of the cylinder 38. The gap C4 is defined between an end surface of the shaft 34 and the bottom plate 40 of the sleeve 22.

The gaps C1 to C3 are filled with an oil (working fluid) F. The liquid surface of the oil F is positioned in the capillary seal 42, where the oil F can be held and prevented from leaking out by surface tension.

When the rotor 16 rotates around the central axis thereof in one direction relative to the sleeve 22, the oil F is attracted along the radial-pressure-generating grooves 37 from near the bottom plate 40 and the circular plate 35 into a region of the gap C3 where the radial-pressure-generating grooves 37 are formed. The attracted oil F forms a peak-pressure region around the circumference of the shaft 34. The dynamic pressure of the region maintains the shaft 34 substantially in the center of the sleeve 22 in the radial direction.

The oil F is also attracted along the thrust-pressure-generating grooves 47 from near the outer edges of the thrust surfaces 46 and the clearance portions 45 into the gaps C1 and C2 to form annular pressure-generating regions A where a dynamic pressure is generated around the circumference of the thrust bearing portion 39. The dynamic pressure of the regions allows the thrust bearing portion 39 to rotate substantially in the center in the axial direction, between the inner surface of the recess 36 and the surface of the stopper 33.

The operation of the fluid dynamic bearing 10, the motor 17 including the bearing 10, and the recording-medium driving apparatus 1 including the bearing 10 according to this embodiment will be described.

The recording-medium driving apparatus 1 starts to rotate the recording medium HD by supplying a three-phase alternating current to the coils 25 of the stator 11 of the motor 17. The coils 25 then generate an alternating magnetic field acting on the permanent magnet 14 to rotate the rotor 16. The recording medium HD rotates as the rotor 16 rotates because the recording medium HD is fixed to the rotor 16.

As the rotor 16 rotates in one direction, the shaft 34, which is integrated with the rotor 16, rotates in the direction. The rotation of the shaft 34 causes the radial-pressure-generating grooves 37, which are disposed on the shaft 34, and the thrust-pressure-generating grooves 47, which are disposed on the sleeve 22, to produce dynamic pressure in the gaps C1 to C3. The dynamic pressure produced around the circumferential surface of the shaft 34 is uniform around the circumference thereof, so that the shaft 34 is kept in balance along the central axis of the sleeve 22. The dynamic pressure produced around the thrust surfaces 46 of the thrust bearing portion 39 pushes the thrust bearing portion 39 uniformly in the thickness direction thereof, so that the thrust bearing portion 39 is kept in balance substantially in the center in the axial direction in the space between the inner surface of the recess 36 of the rotor 16 and the surface of the stopper 33.

No dynamic pressure occurs when the motor 17 is stopped, and thus the rotor 16 falls in the gravity direction inside the sleeve 22. If, for example, the recording-medium driving apparatus 1 is oriented as shown in FIG. 1, the rotor 16 falls axially with respect to the sleeve 22, and accordingly the upper gap C1 becomes narrower than the lower gap C2. When the motor 17 is started in this state, the thrust-pressure-generating grooves 47 attract the oil F radially outward from near the clearance portions 45 in the gaps C1 and C2. In the fluid dynamic bearing 10 according to this embodiment, the oil F is supplied from the lower gap C2, which is wider, to the upper gap C1, which is narrower, through the through-holes 48 provided in the thrust surfaces 46.

This structure can avoid an excessive negative pressure when the oil F is attracted into the narrower gap C1, thus preventing generation of bubbles in the oil F. In particular, the generation of bubbles can be prevented even after sudden attraction of the oil F on startup because the oil F can be directly supplied to the thrust surfaces 46 through the through-holes 48 provided therein.

According to this embodiment, additionally, the beveled portions 49 provided around the openings of the through-holes 48 can enhance the effect described above because the beveled portions 49 allow smooth, distributed supply of the oil F over the pressure-generating regions A from the through-holes 48.

The prevention of bubbles in the oil F contributes to suppression of variations of the dynamic pressure occurring in the pressure-generating regions A so that the rotor 16 can be stably rotated without vibrations. The prevention of bubbles also allows the oil F to constantly separate the rotor 16 and the sleeve 22 and to constantly separate the sleeve 22 and the stopper 33, thus preventing, for example, damage due to contact therebetween.

In addition, the fluid dynamic bearing 10 can prevent problems such as oil leakage because no bubbles squeeze the oil F from the gaps C1 to C4. Accordingly, the fluid dynamic bearing 10 can eliminate the need to use an absorbing member for absorbing leaking oil, thus facilitating a reduction in the thickness of the recording-medium driving apparatus 1.

If bubbles occur or are originally present, they are sucked into the through-holes 48 as the rotor 16 rotates. These bubbles do not cause the problems described above because the bubbles remain in the through-holes 48 and are not attracted into the pressure-generating regions A.

In addition, in the fluid dynamic bearing 10 according to this embodiment, the through-holes 48 are provided at two positions symmetrical with respect to the central axis. This arrangement allows distributed supply of the oil F over the pressure-generating regions A and ensures the weight and rotation balance of the rotor 16.

As described above, the recording-medium driving apparatus 1 including the motor 17 including the fluid dynamic bearing 10 according to this embodiment can stably rotate the recording medium HD without vibrations to achieve accurate writing and reading of information to and from the recording medium HD.

The thrust-pressure-generating grooves 47 are formed so as to produce a higher dynamic pressure around the outer edge of the thrust bearing portion 39 than around the inner edge of the thrust bearing portion 39 by, for example, shifting the bending points of the thrust-pressure-generating grooves 47 radially outward or varying the height thereof so that they have different heights between the inner and outer portions in the radial direction. The higher dynamic pressure provides a larger force tending to support the rotor 16 and the sleeve 22 around the outer edge of the thrust bearing portion 39. As a result, the rotor 16 can be stably supported during rotation to reduce nonrepeatable runout (NRRO).

The surface tension of the oil F in the capillary seal 42 tends to decrease the liquid surface area of the oil F, that is, tends to push the oil F in a direction in which the sleeve seal surface 43 and the stopper seal surface 53 approach each other. The capillary seal 42 can therefore hold the oil F and prevent it from leaking out.

In addition, as the rotor 16 rotates, the oil F is rotated by friction with the stopper seal surface 53 and experiences a centrifugal force. This centrifugal force presses the oil F against the stopper seal surface 53 and pushes it toward the thrust bearing portion 39 along the stopper seal surface 53. The capillary seal 42 can therefore more reliably hold the oil F during the rotation of the rotor 16.

Furthermore, because the capillary seal 42 can prevent oil leakage, it can eliminate the need to use an absorbing member for absorbing leaking oil, thus facilitating a reduction in the thickness of the recording-medium driving apparatus 1.

Figure 6:
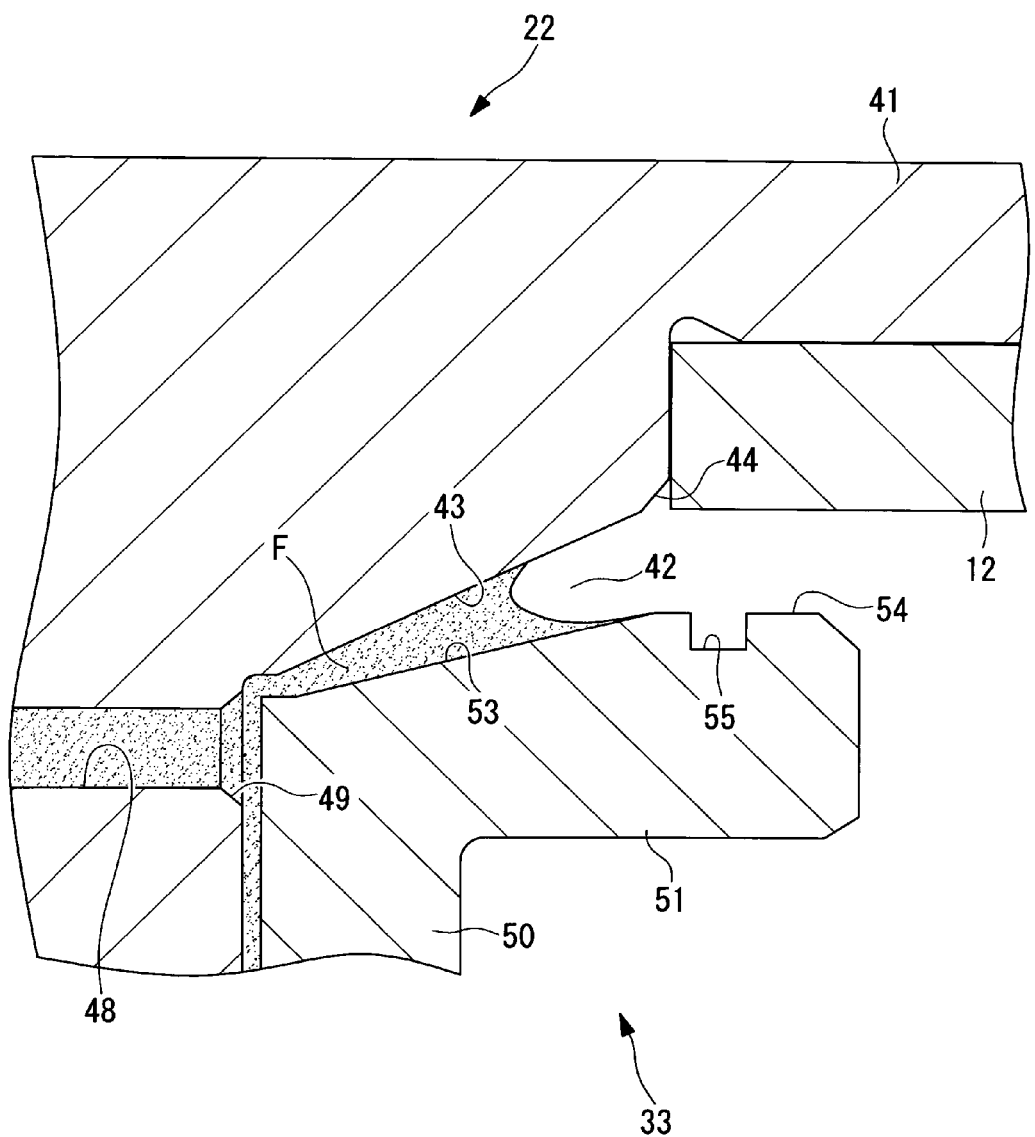
FIG. 6 is a diagram illustrating the effect of the capillary seal shown in FIG. 4.
Figure 7:
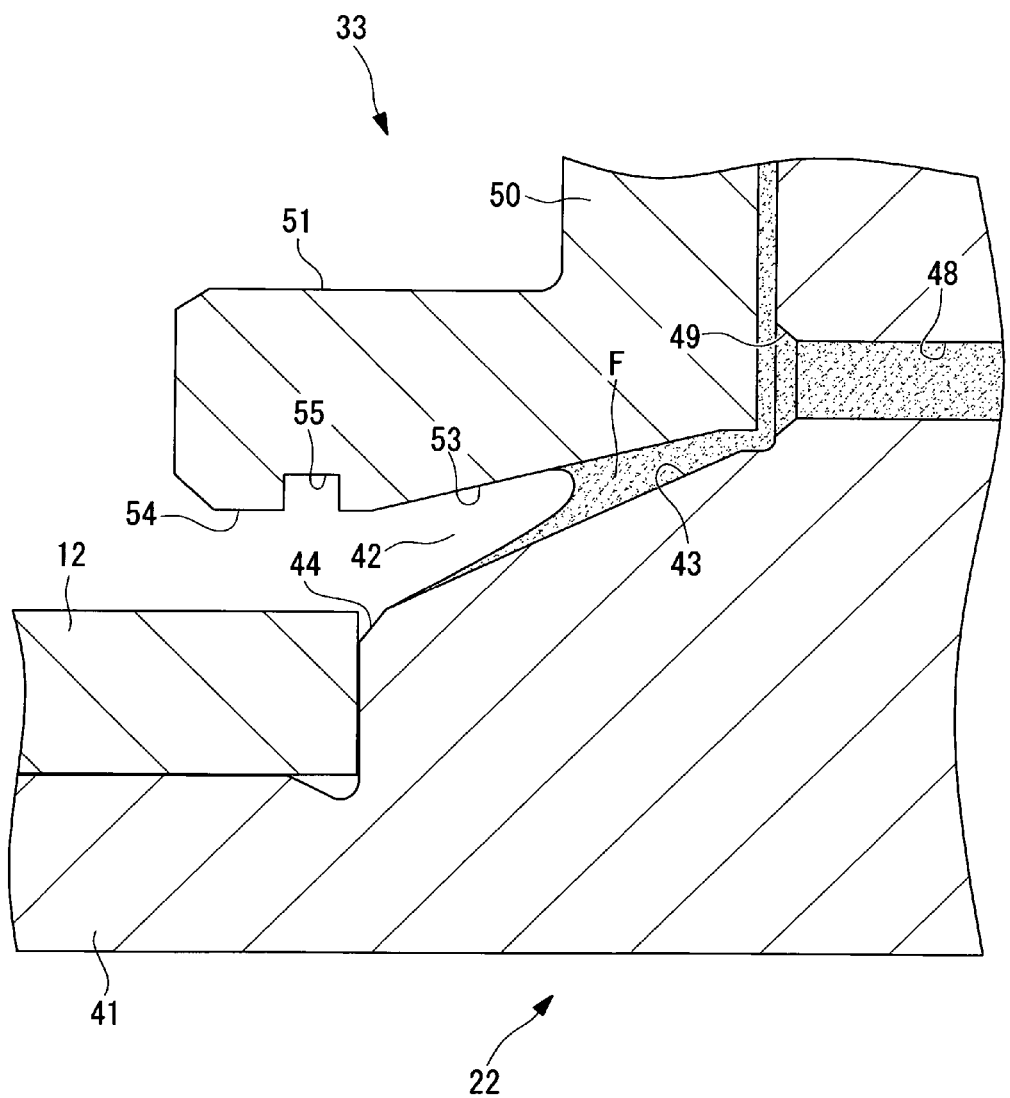
FIG. 7 is a diagram illustrating the effect of the capillary seal shown in FIG. 4.

The shape of the liquid surface of the oil F in the capillary seal 42 is varied by gravity if the recording-medium driving apparatus is oriented horizontally, as shown in FIGS. 6 and 7.

If the stopper seal surface 53 is located at a lower position, as shown in FIG. 6, the oil F spreads to the right in FIG. 6 along the stopper seal surface 53 due to gravity. The groove 55 can then prevent the oil F from further spreading to the right, thus holding the oil F and preventing it from leaking out.

If the sleeve seal surface 43 is located at a lower position, as shown in FIG. 7, the oil F spreads to the left in FIG. 7 along sleeve seal surface 43 due to gravity. The oil-blocking surface 44 can then prevent the oil F from further spreading to the left, thus holding the oil F and preventing it from leaking out.

Figure 8:
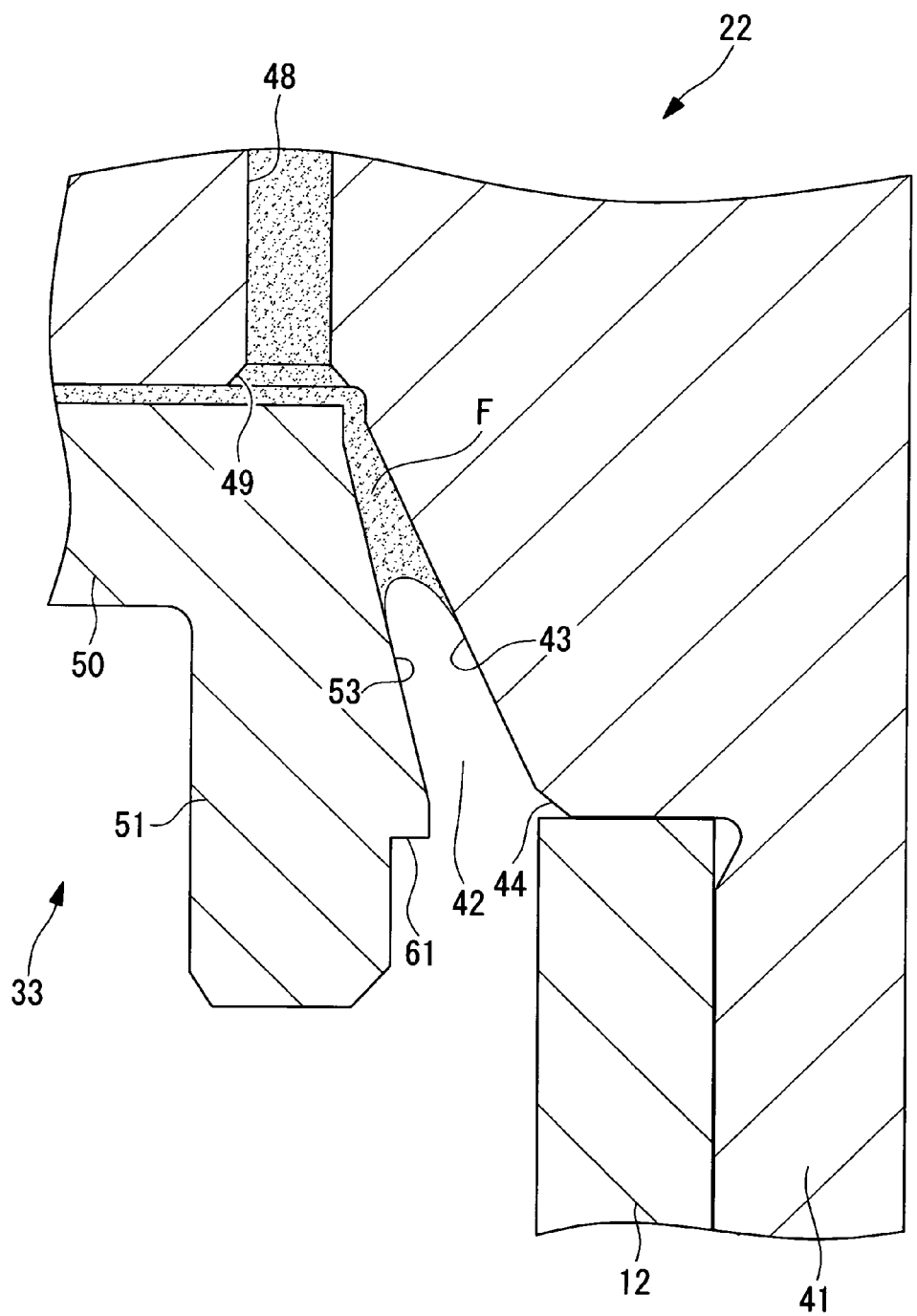
FIG. 8 is an enlarged sectional view of a capillary seal according to another embodiment.
Figure 9:
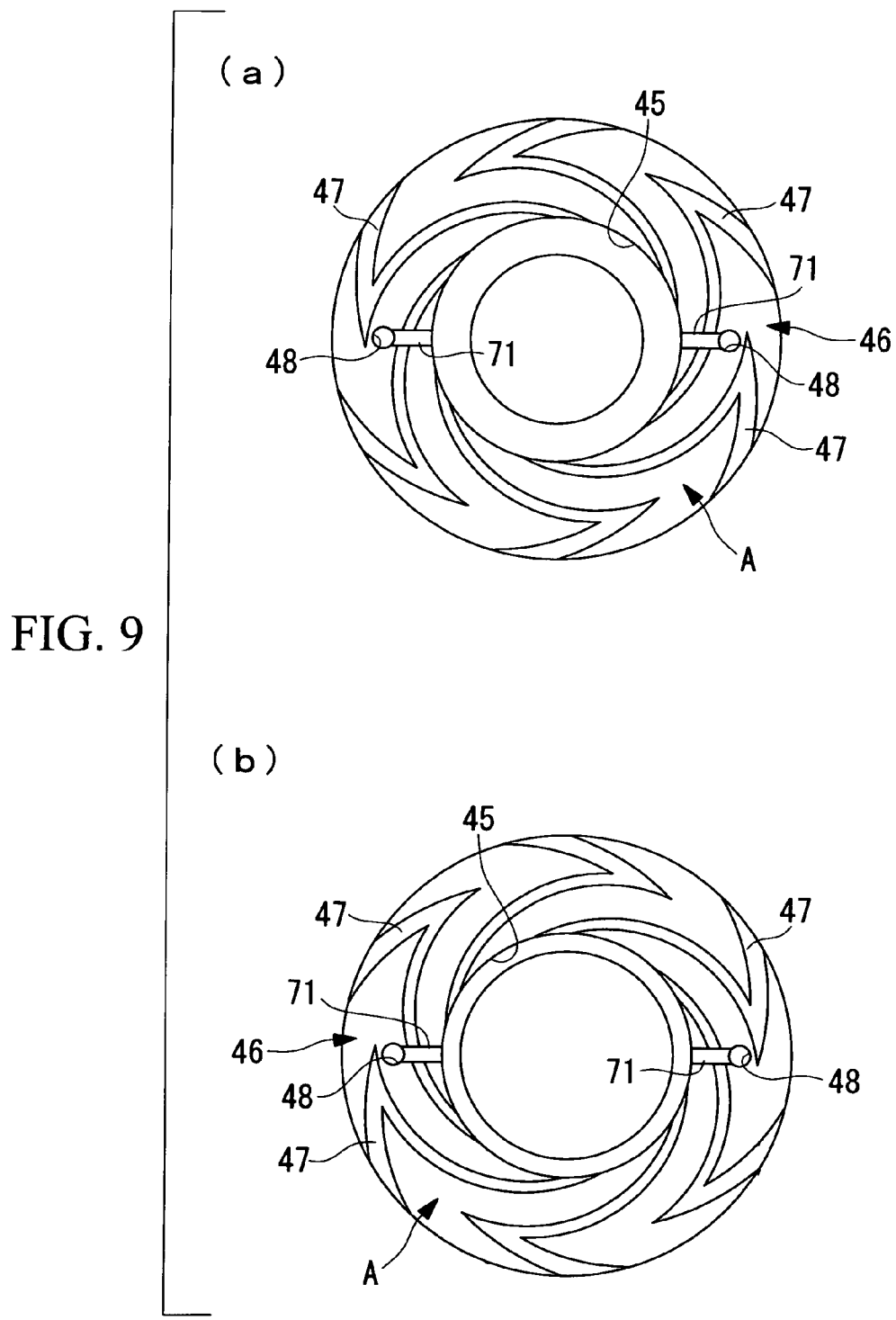
FIG. 9(a) is a plan view of thrust-pressure-generating grooves and through-holes formed in a top end surface of a thrust bearing portion according to another embodiment.
FIG. 9(b) is a plan view of thrust-pressure-generating grooves and through-holes formed in a bottom end surface of the thrust bearing portion according to the other embodiment.
Figure 10:
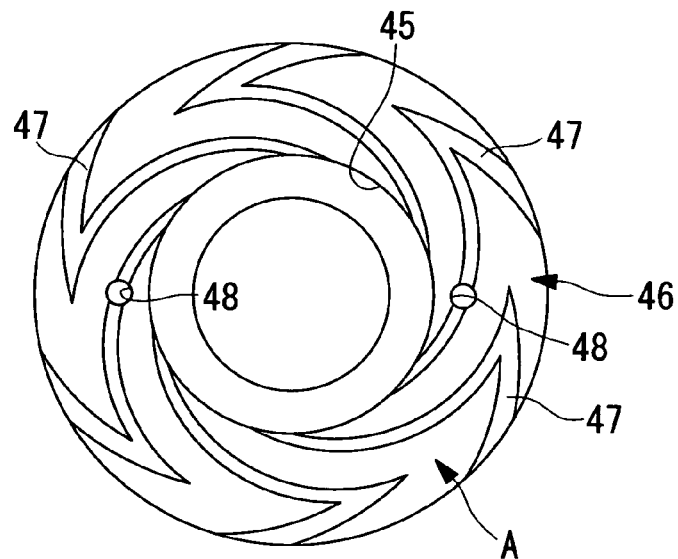
FIG. 10(a) is a plan view of thrust-pressure-generating grooves and through-holes formed in a top end surface of a thrust bearing portion according to another embodiment.
FIG. 10(b) is a plan view of thrust-pressure-generating grooves and through-holes formed in a bottom end surface of the thrust bearing portion according to the other embodiment.
Figure 10:
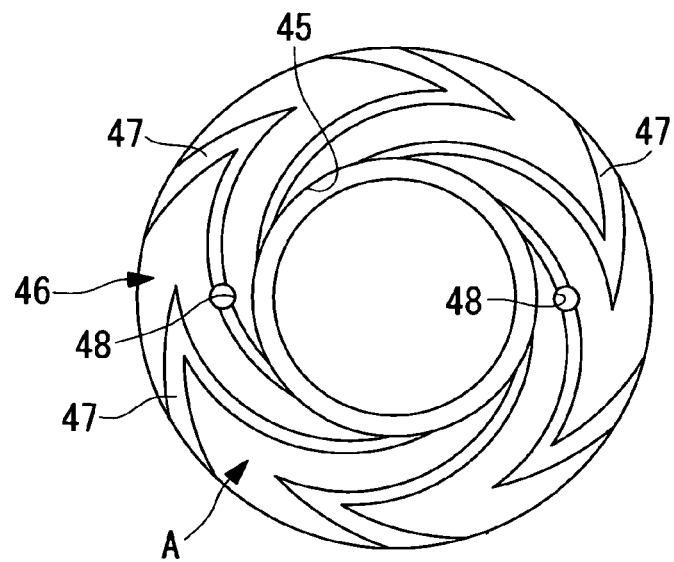

Although the groove 55 may be formed on the stopper 33 to prevent the leakage of the oil F, as described above, a step 61 may be formed to prevent the leakage of the oil F, as shown in FIG. 8.

The step 61 is formed in the inner cylinder circumferential surface 54 so as to extend radially outward. The step 61 can prevent the movement of the oil F to hold and prevent it from leaking out.

Although the through-holes 48 and the clearance portions 45 are connected through the beveled portions 49 provided around the openings of the through-holes 48 in this embodiment, as shown in FIGS. 4 and 5, linear communicating grooves 71 may instead be provided to directly connect the through-holes 48 and the clearance portions 45, as shown in FIGS. 9(a) and 9(b). In this case, the communicating grooves 71 preferably have substantially the same depth as the clearance portions 45 to allow bubbles to smoothly escape from the clearance portions 45 into the through-holes 48 without being trapped at any step. Also, sloped portions may be provided such that the depth thereof decreases gradually from the clearance portions 45 to the through-holes 48. These sloped portions allow bubbles to smoothly escape into the through-holes 48 without being trapped at any step.

Referring to FIGS. 10(a) and 10(b), alternatively, the through-holes 48 may be positioned so as to coincide with any of the thrust-pressure-generating grooves 47. In this case, the thrust-pressure-generating grooves 47 themselves can be used as communicating grooves for connecting the through-holes 48 and the clearance portions 45.

Figure 11:
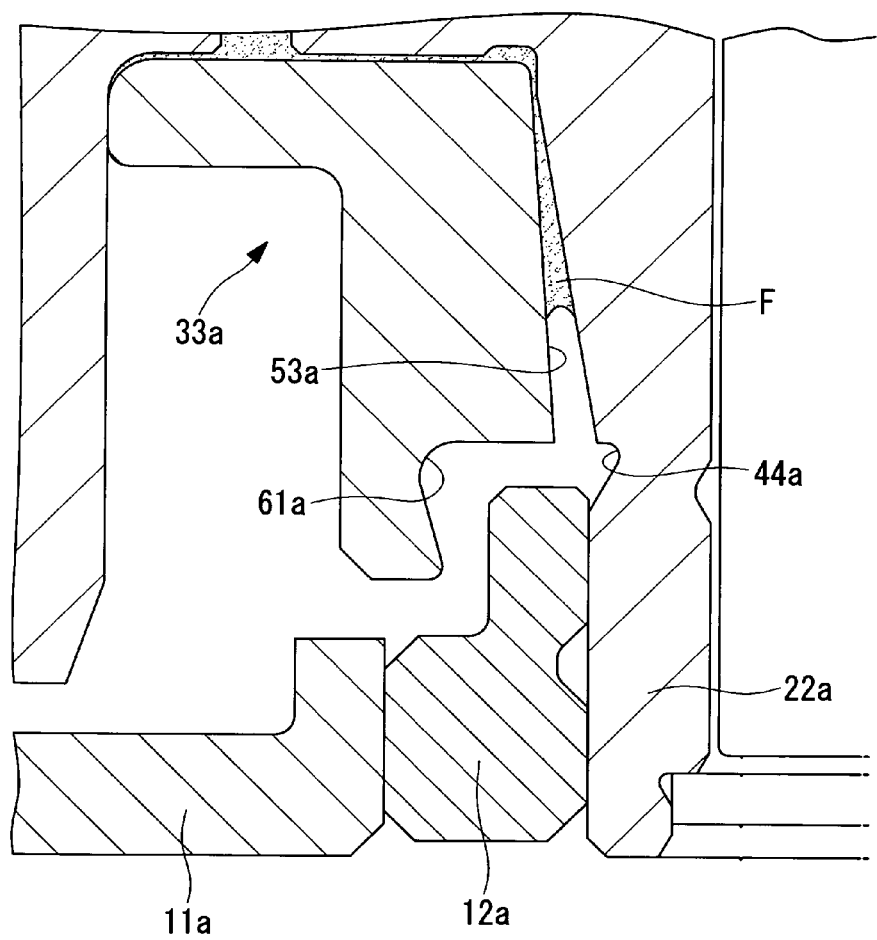
FIG. 11 is an enlarged sectional view of a sleeve and a boss according to another embodiment.

Although the boss 12 of the stator 11 may be disposed so as to butt against the end surface of the sleeve 22 (see FIG. 1), as described above, a boss 12a may be disposed so as not to butt against an end surface of a sleeve (support) 22a, as shown in FIG. 11.

In the structure shown in FIG. 11, an annular oil-blocking groove 44a is provided in a side surface of the sleeve 22a instead of the oil-blocking surface 44 (see FIG. 4), which is formed by C-beveling the corner of a butting portion of the sleeve 22. The oil-blocking groove 44a has the same effect as the oil-blocking surface 44, that is, the effect of preventing the leakage of the oil F.

In addition, a step 61a is provided at the bottom end (the lower end in FIG. 11) of the stopper seal surface 53 of the stopper 33 so that the stopper 33 does not butt against the boss 12a. The step 61a has the same effect as the step 61, that is, the effect of preventing the leakage of the oil F.

The boss 12a and the stator 11 are provided as separate members, and the sleeve 22 is disposed inside the boss 12a.

The relative positions of the boss 12a and the sleeve 22 can be constantly maintained because they are positioned using a jig during assembly.

Figure 12:
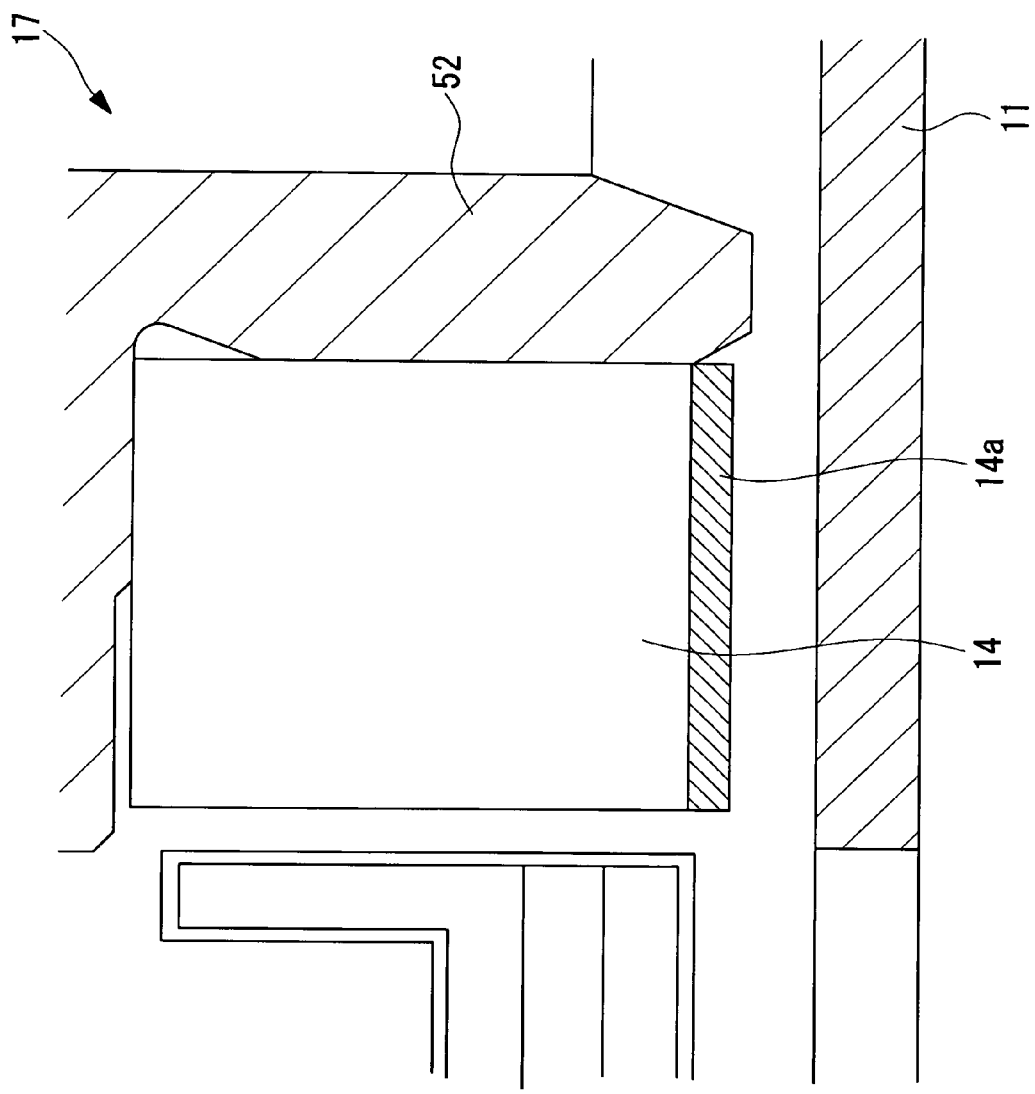
FIG. 12 is an enlarged sectional view of a permanent magnet according to another embodiment.

Although no component is disposed on a surface of the permanent magnet 14 opposite the stator 11 (see FIG. 1), as described above, a magnetic material layer 14a may be disposed on the surface of the permanent magnet 14 opposite the stator 11, as shown in FIG. 12.

In the structure shown in FIG. 12, the magnetic material layer 14a restrains the direction of a magnetic flux exiting and entering pole surfaces of the permanent magnet 14 to prevent the magnetic flux from reaching the stator 11. Therefore, even if the stator 11 is formed of a magnetic material such as iron, the permanent magnet 14 can be rotated relative to the stator 11 in close proximity without causing iron losses, including eddy current loss leading to loss of the power of the motor 17 and magnetic hysteresis loss. In addition, this structure allows the permanent magnet 14 to be positioned close to the surface of the stator 11, thus contributing to a reduction in the thickness of the motor 17.

The permanent magnet 14 may have an anticorrosive coating. The coating used may be, for example, an electrodeposited epoxy layer or a nickel plating layer typically having a thickness of about 30 μm, although any other coating having an anticorrosive effect can be used.

The coating may be formed on the permanent magnet 14 at any timing, for example, before or after the magnetic material layer 14a is provided on the permanent magnet 14.

The technical scope of the present invention is not limited to the embodiments described above, and various modifications are permitted without departing from the spirit of the present invention.

For example, although the fluid dynamic bearing is applied to an inner-rotor motor in the embodiments described above, the bearing may also be applied to various other motors, including outer-rotor motors.

The invention claimed is:

1. A fluid dynamic bearing comprising:
   a shaft member including a substantially cylindrical portion and a circular plate extending radially outward from the cylindrical portion;
   a support including a cylinder having a closed end and rotatably accommodating the cylindrical portion, and a flange-shaped thrust bearing portion extending radially outward from the cylinder;
   a stopper engaged with the circular plate such that the thrust bearing portion is held therebetween; and
   a working fluid filling gaps between the shaft member and the support and between the support and the stopper;
   wherein pressure-generating grooves are provided in opposed thrust surfaces of the thrust bearing portion that are opposite the circular plate and the stopper to attract the working fluid from inner and outer edges of the thrust bearing portion to a radially midway portion thereof as the shaft member rotates relative to the support; and
   wherein one or more through-holes are provided between inner edges of annular regions of the thrust surfaces in which the pressure-generating grooves are provided and the midway portion in the radial direction, each through-hole extending through the thrust bearing portion in a central-axis direction of the shaft member and being positioned to interconnect pressure generating grooves in the opposed thrust surfaces.

2. A fluid dynamic bearing according to claim 1; wherein the pressure-generating grooves produce a higher working-fluid pressure at the outer edge of the thrust bearing portion than at the inner edge thereof.

3. A fluid dynamic bearing according to claim 1; wherein substantially the entirety of each through-hole is positioned in the annular regions in which the pressure-generating grooves are provided.

4. A fluid dynamic bearing according to claim 1; wherein
   annular grooves are provided radially inside the annular regions around the circumference thereof to define clearance portions; and
   each through-hole is positioned to be connected to the pressure-generating grooves, areas of the annular regions other than the pressure-generating grooves, and the clearance portions.

5. A fluid dynamic bearing according to claim 1; wherein the one or more through-holes comprise a plurality of through-holes arranged at regular intervals in a circumferential direction of the thrust bearing portion around the central axis.

6. A motor comprising the fluid dynamic bearing according to claim 1 and a drive unit configured to rotate the shaft member of the fluid dynamic bearing relative to the support.

7. A recording-mediuim driving apparatus comprising the motor according to claim 6 and a fixing portion for fixing a recording medium to the shaft member or the support.

8. A fluid dynamic bearing comprising:
   a shaft member including a substantially cylindrical portion and a circular plate extending radially outward from the cylindrical portion;
   a support including a cylinder having a closed end and rotatably accommodating the cylindrical portion, and a flange-shaped thrust bearing portion extending radially outward from the cylinder;
   a stopper engaged with the circular plate such that the thrust bearing portion is held therebetween; and
   a working fluid filling gaps between the shaft member and the support and between the support and the stopper;
   wherein at least part of a cylinder seal surface of the cylinder opposite the stopper and a stopper seal surface of the stopper opposite the cylinder is inclined in a direction away from the thrust bearing portion so as to approach the central axis and so that the seal surfaces diverge; and
   wherein the stopper seal surface is longer in the direction away from the thrust bearing portion than the cylinder seal surface.

9. A fluid dynamic bearing according to claim 8; wherein a groove is provided in the stopper seal surface to prevent the working fluid from leaking along the stopper seal surface.

10. A fluid dynamic bearing according to claim 8; wherein a step is provided in the stopper seal surface to prevent the working fluid from leaking along the stopper seal surface.

11. A motor comprising the fluid dynamic bearing according to claim 8 and a drive unit configured to rotate the shaft member of the fluid dynamic bearing relative to the support.

12. A recording-medium driving apparatus comprising the motor according to claim 11 and a fixing portion for fixing a recording medium to the shaft member or the support.

13. A fluid dynamic bearing comprising:
   a support having a cylindrical opening that is closed at one end and an annular thrust bearing portion that extends radially outward of the cylindrical opening at the other end thereof, the thrust bearing portion having two opposed thrust surfaces;
   a shaft member having a cylindrical shaft portion rotatably disposed in the cylindrical opening and a head portion extending radially outward from an end of the shaft portion that projects out of the cylindrical opening, the head portion overlying one of the thrust surfaces;

a ring-shaped stopper affixed to the shaft member and encircling the support, the stopper overlying the other one of the thrust surfaces and preventing withdrawal of the shaft portion from the cylindrical opening;

a working fluid disposed in gaps between the shaft member and the support and between the support and the stopper;

pressure-generating grooves formed in the opposed thrust surfaces to direct the working fluid from inner and outer edges of the thrust bearing portion towards a radial intermediate portion thereof in response to rotation of the shaft member relative to the support; and one or more through-holes extending through the thrust bearing portion, each through-hole opening at one end into a pressure-generating groove in one thrust surface and opening at the other end into a pressure-generating groove in the other thrust surface.

14. A fluid dynamic bearing according to claim 13; wherein the thrust bearing portion has on opposite sides thereof respective annular grooves that are radially inward of the pressure-generating grooves, each through-hole opening at opposite ends thereof into one of the annular grooves.

15. A fluid dynamic bearing according to claim 14; wherein the ends of each through-hole flare outwardly in a direction toward the end of the through-hole, the flared ends of each through-hole opening into the annular grooves on opposite sides of the thrust bearing portion.

16. A fluid dynamic bearing according to claim 15; wherein the flared ends of each through-hole open into one of the pressure-generating grooves in the thrust surfaces on opposite sides of the thrust bearing portion.

17. A fluid dynamic bearing according to claim 13; wherein the one or more through-holes comprise plural through-holes disposed in circumferentially spaced relation around the annular thrust bearing portion.

18. A fluid dynamic according to claim 13; wherein the pressure-generating grooves are configured and arranged to produce a higher working-fluid pressure at the outer edge of the thrust bearing portion than at the inner edge threeof.

19. A recording medium driving apparatus comprising a motor having the fluid dynamic bearing according to claim 13 for rotationally driving the shaft member relative to the support, and a fixing portion for fixing a recording medium to the head portion of the shaft member.

* * * * *